(12) United States Patent
Taheri

(10) Patent No.: US 9,304,333 B2
(45) Date of Patent: Apr. 5, 2016

(54) ELECTRONICALLY DIMMABLE OPTICAL DEVICE

(71) Applicant: ALPHAMICRON INCORPORATED, Kent, OH (US)

(72) Inventor: Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 14/445,460

(22) Filed: Jul. 29, 2014

(65) Prior Publication Data

US 2014/0340728 A1    Nov. 20, 2014

Related U.S. Application Data

(63) Continuation of application No. PCT/US2013/024044, filed on Jan. 31, 2013.

(60) Provisional application No. 61/592,883, filed on Jan. 31, 2012.

(51) Int. Cl.
*G02F 1/03* (2006.01)
*G02F 1/07* (2006.01)
(Continued)

(52) U.S. Cl.
CPC .............. *G02F 1/0136* (2013.01); *B60R 1/088* (2013.01); *G02B 5/3025* (2013.01); *G02B 27/281* (2013.01); *G02F 1/13475* (2013.01); *G02F 1/133528* (2013.01); *G02F 1/133536* (2013.01); *G02F 2001/133531* (2013.01); (Continued)

(58) Field of Classification Search
USPC ............... 359/246, 250, 437, 485.02, 485.03, 359/245, 251, 204.3, 207.9, 281, 283, 301, 359/304, 487.01–494.01; 245/246
See application file for complete search history.

(56) References Cited

U.S. PATENT DOCUMENTS

| 4,086,101 A | 4/1978 | Jordan et al. | 136/89 CD |
| 4,159,914 A | 7/1979 | Jordan et al. | 136/89 TF |

(Continued)

FOREIGN PATENT DOCUMENTS

| EP | 0 614 784 A1 | 3/1994 | B60R 1/08 |
| WO | WO 02/41049 A2 | 5/2002 | G02B 5/26 |
| WO | WO 2007/034469 A1 | 3/2007 | G02F 1/13 |

OTHER PUBLICATIONS

International Search Report mailed Sep. 28, 2006 in corresponding application No. PCT/IL2006/000713.

(Continued)

*Primary Examiner* — Bumsuk Won
*Assistant Examiner* — Tamara Y Washington
(74) *Attorney, Agent, or Firm* — Renner Kenner Greive Bobak Taylor & Weber

(57) ABSTRACT

An electronically dimmable optical device, including, in sequence, an active absorbing polarizer; a first static reflective polarizer; an active polarization rotator; and a second static reflective polarizer; configured so that the reflectivity and/or transmissivity of the device can be controlled (increased or decreased) by application of a voltage across the active absorbing polarizer and/or the active polarization rotator. One or more polarization levels can be selected by controlling the voltage at the active absorptive polarizer such that setting the active absorptive polarizer to a selected polarization level determines the brightness of an image produced by the device.

25 Claims, 6 Drawing Sheets

(51) Int. Cl.
*G02F 1/01* (2006.01)
*G02B 27/28* (2006.01)
*B60R 1/08* (2006.01)
*G02B 5/30* (2006.01)
*G02F 1/1335* (2006.01)
*G02F 1/1347* (2006.01)
*G02F 1/13363* (2006.01)

(52) U.S. Cl.
CPC . *G02F2001/133638* (2013.01); *G02F 2203/01* (2013.01); *G02F 2203/02* (2013.01); *G02F 2203/62* (2013.01)

(56) References Cited

U.S. PATENT DOCUMENTS

| | | | |
|---|---|---|---|
| 4,200,361 A | 4/1980 | Malvano et al. | 350/336 |
| 4,287,383 A | 9/1981 | Peterson | 136/260 |
| 4,299,444 A | 11/1981 | Romer | 350/278 |
| 4,589,735 A | 5/1986 | Saunders | 350/338 |
| 4,632,509 A | 12/1986 | Ohmi et al. | 350/283 |
| 4,660,937 A | 4/1987 | Richardson | 350/349 |
| 4,664,479 A | 5/1987 | Hiroshi | 350/338 |
| 4,676,601 A | 6/1987 | Itoh et al. | 350/331 |
| 4,690,508 A | 9/1987 | Jacob | 350/331 R |
| 4,902,108 A | 2/1990 | Byker | 350/357 |
| 4,916,307 A | 4/1990 | Nishibe et al. | 250/214 |
| 4,917,477 A | 4/1990 | Bechtel et al. | 350/357 |
| 5,059,809 A | 10/1991 | Fukuyama | 250/551 |
| 5,115,346 A | 5/1992 | Lynam | 359/604 |
| 5,117,118 A | 5/1992 | Fukuyama | 250/551 |
| 5,214,274 A | 5/1993 | Yang | 250/208.1 |
| 5,243,215 A | 9/1993 | Enomoto et al. | 257/443 |
| 5,338,691 A | 8/1994 | Enomoto et al. | 437/3 |
| 5,469,296 A | 11/1995 | Ohno et al. | 359/603 |
| 5,521,744 A | 5/1996 | Mazurek | 359/267 |
| 5,679,283 A | 10/1997 | Tonar et al. | 252/583 |
| 5,708,410 A | 1/1998 | Blank et al. | 340/438 |
| 5,724,187 A | 3/1998 | Varaprasad et al. | 359/608 |
| 5,725,809 A | 3/1998 | Varaprasad et al. | 252/583 |
| 5,789,737 A | 8/1998 | Street | 250/208.1 |
| 5,808,778 A | 9/1998 | Bauer et al. | 359/267 |
| 5,841,496 A | 11/1998 | Itoh et al. | 349/113 |
| 5,936,231 A | 8/1999 | Michiyama et al. | 250/214 A |
| 6,008,871 A | 12/1999 | Okumura | 349/61 |
| 6,144,430 A | 11/2000 | Kuo | 349/113 |
| 6,317,180 B1 | 11/2001 | Kuroiwa et al. | 349/96 |
| 6,359,670 B1 | 3/2002 | Broer et al. | 349/115 |
| 6,717,639 B2 | 4/2004 | Jung | 349/106 |
| 6,759,945 B2 | 7/2004 | Richard | 340/179 |
| 6,784,956 B2 | 8/2004 | Matsumoto et al. | 349/110 |
| 7,298,540 B2 * | 11/2007 | Peng et al. | 359/256 |
| 7,379,243 B2 | 5/2008 | Horsten et al. | 359/501 |
| 7,656,586 B2 | 2/2010 | Rosario et al. | 359/633 |
| 2004/0100598 A1 | 5/2004 | Adachi et al. | 349/113 |
| 2005/0007506 A1 | 1/2005 | Faris et al. | 349/16 |
| 2005/0146791 A1 | 7/2005 | Bechtel et al. | 359/604 |
| 2006/0244882 A1* | 11/2006 | Watson et al. | 349/98 |
| 2007/0041096 A1* | 2/2007 | Nieuwkerk et al. | 359/483 |
| 2007/0183037 A1 | 8/2007 | De Boer et al. | 359/487 |
| 2008/0068520 A1* | 3/2008 | Minikey et al. | 349/11 |
| 2008/0131138 A1* | 6/2008 | Futami et al. | 398/152 |
| 2008/0205076 A1 | 8/2008 | Taheri et al. | 362/494 |
| 2009/0109393 A1 | 4/2009 | Borenstein et al. | 349/195 |
| 2009/0284670 A1* | 11/2009 | Xue | 349/16 |

OTHER PUBLICATIONS

Written Opinion mailed Sep. 28, 2006 in corresponding application No. PCT/IL2006/000713.
International Preliminary Report on Patentability mailed Mar. 26, 2008 in corresponding application No. PCT/IL2006/000713.
International Search Report mailed Feb. 12, 2007 in corresponding application No. PCT/IL2006/000431.
International Search Report mailed Apr. 19, 2013 in corresponding application No. PCT/US2013/024044.
Written Opinion mailed Apr. 19, 2013 in corresponding application No. PCT/US2013/024044.
Office Action mailed Jul. 1, 2010 in corresponding application No. 11/910,875.
Response filed Mar. 26, 2012 in corresponding application No. 11/910,875.
Office Action mailed Oct. 4, 2012 in corresponding application No. 11/910,875.
Response filed Mar. 21, 2013 in corresponding application No. 11/910,875.
RCE as filed Apr. 3, 2013 in corresponding application No. 11/910,875.
Office Action mailed Apr. 22, 2013 in corresponding application No. 11/910,875.
Response filed Oct. 17, 2013 in corresponding application No. 11/910,875.
Office Action mailed Jan. 29, 2014 in corresponding application No. 11/910,875.
Response filed Apr. 29, 2014 in corresponding application 11/910,875.
RCE as filed Jun. 30, 2014 in corresponding application No. 11/910,875.
Office Action mailed Sep. 14, 2011 in corresponding application No. 11/922,932.
Response filed Jan. 16, 2012 in corresponding application No. 11/922,932.
Office Action mailed Mar. 23, 2012 in corresponding application No. 11/922,932.
Response filed Aug. 20, 2012 in corresponding application No. 11/922,932.
RCE filed Aug. 30, 2012 in corresponding application No. 11/922,932.
Office Action mailed Jun. 20, 2013 in corresponding application No. 11/922,932.
Response filed Oct. 21, 2013 in corresponding application No. 11/922,932.
Extended Search Report mailed Sep. 9, 2015 in corresponding European application No. 13744392.5.

* cited by examiner

ELECTRONICALLY DIMMABLE OPTICAL DEVICE

CROSS-REFERENCE TO RELATED APPLICATION

This application is a continuation application of International patent application number PCT/US2013/024044 filed Jan. 31, 2013, which claims priority to, and any other benefit of, U.S. Provisional Patent Application Ser. No. 61/592,883 entitled ELECTRONICALLY DIMMABLE MIRROR and filed Jan. 31, 2012, both of which are fully incorporated herein by reference.

TECHNICAL FIELD

The present invention relates to electronically dimmable reflective or transmissive optical devices using various reflective polarizer, absorptive polarizer and polarizer rotator configurations for use in vehicles, windows, visors, helmets, mobile phones and various other applications.

BACKGROUND ART

In vehicles, drivers generally use an interior rearview mirror and two exterior side view mirrors (hereinafter referred to collectively as "rearview mirrors"). The rearview mirrors allow the driver to view scenes behind the vehicle without having to face in a rearward direction and to view areas around the vehicle that would otherwise be blocked by the vehicle structure. As such, these mirrors are an important source of information to the driver. Bright lights appearing in a scene behind the vehicle, such as from another vehicle approaching from the rear, may create glare in a rearview mirror that can temporarily visually impair or dazzle the operator. This problem is only aggravated under low ambient light conditions such as at night, when the eyes of the driver have adjusted to the darkness.

Various solutions have evolved to deal with the problem of glare in rearview mirrors of vehicles. One conventional solution to this problem, used primarily with interior, center-mounted rear view mirrors, is to employ a prismatic mirror with a switch lever on the mirror housing. The switch can be manually moved between a daytime position, providing direct, normal intensity reflection from the mirror surface, and a nighttime position, providing a reduced intensity reflection. When the driver experiences glare, he manually changes the rearview mirror setting to low reflectivity. With the low intensity of light reflected to the driver, the intensity of reflected headlights from trailing vehicles is insufficient to impair the driver's vision. Once the glare is subsided, the driver can manually switch the rearview mirror back to high reflectivity. Difficulties with manually controlled mirrors include the glare experienced before the mirror could be switched, as well as driver distraction caused by finding and operating the switch lever.

Other solutions include automatically dimming rearview mirrors which eliminate the need for the operator to manually switch the mirror. Improvements in glare reduction occurred when prismatic mirrors having two states were replaced with multi-state mirrors which include dimming elements capable of providing many levels of reflectivity reduction. One type of such multi-state automatically dimming rearview mirror is based on changes in the absorption spectra of some materials due to a change in the oxidation state induced by an external current flow. This effect is referred to in the literature as the electrochromic effect and such automatically dimming rearview mirrors are commonly termed electro-chromic mirrors. An electrochromic mirror includes an electrochromic medium connected between two electrodes. The electrochromic medium is responsive to external current generated by applying charge to a pair of electrodes. When a sufficient electrical current is applied across the electrodes of the automatically dimming rearview mirror, the electrochromic medium enters a tinted state by changing its spectral characteristics. However, electrochromic mirrors suffer from many limitations such as slow response rate, high temperature sensitivity, and high power consumption.

Other known automatically dimming mirrors make use of the properties of liquid crystals. Liquid crystals have very fast response time, lower power consumption, and low temperature sensitivity in useable range. Application of an electric field reorients the liquid crystal molecules and changes their optical properties such as birefringence or absorption. In liquid crystal based dimming systems, when the molecules are in the realignment state, the light reflected from the mirrors is attenuated to a degree that is normally proportional to the applied electric field. Upon reducing or removing the applied electric field, the system returns to a normal, more transparent state. Using such mirrors, therefore, it is possible to obtain selectively a high or a low reflecting power, according to whether the electrical voltage applied to the liquid crystal is lower or greater than the threshold. However, liquid crystal based systems typically use static (not switchable) absorptive polarizers for light attenuation, which often reduces the reflectivity to <50% or <40%, even in the highly reflective state. This low reflectance automatically eliminates their use for many applications including rearview mirrors. More recently, guest host systems have been proposed to overcome this limitation. However, these systems still do not offer the high reflectance or wide swing in the reflectivity between the clear and the dark state that is achievable with electrochromic systems.

To circumvent the issue associated with static absorptive polarizers, the use of switchable polarizers has been proposed. These can be reflective such as the device in U.S. Pat. No. 7,362,505 (Hikmet et al.) or absorptive, such as the device in US Pub. No. 2005/0057701 (Weiss). However, switchable reflective polarizers based on cholesterics do not possess the optical or electrical characteristics needed for many dimmable mirror applications. For example, it is well known that switchable cholesteric polarizers have a high degree of haze in both transmissive and reflective states, which makes them unsuitable for optical applications, particularly when a single light source (such as a headlamp of a car) is used. Furthermore, they require high switching voltage and have an undesirably long relaxation time (e.g. several minutes) to the reflective state. These drawbacks make them unsuitable for dimmable mirror applications.

Absorptive active polarizers have been suggested for auto-dimming applications (see e.g. Weiss, US Pub. No. 2005/0057701). In these systems, a single active polarizer is used to absorb both polarizations of the incident light. To achieve this, the combination of a quarterwave plate and a highly reflective, polarization independent mirror is used to rotate the polarization of unabsorbed light. The disadvantage of this system is that the reflection will not be uniform across the entire visible spectrum since quarterwave plates are wavelength and angular dependent. As such, the system will exhibit non-uniformity, especially in point source illumination conditions as observed with head lamps at night. In addition, these systems are not compatible for use with displays or other images.

Therefore, there is a need for dimming mirrors that can offer fast response time, low power consumption, and a low temperature sensitivity which also possess a high reflective state and a low dark state with potential for intermediate states.

Similarly, there is a need for electronically dimmable transmissive devices, such as windows in a building, vehicle, airplane, etc., where the amount of light passing through the device can be controlled electronically. Thus, for example, a window can be dimmed in the summer to allow less sunlight into the interior of a building, while during winter months, it can be set to maximum transmissivity to allow more sunlight to enter the building. The present invention provides a description of various novel configurations of an electronically dimmable optical device that can be used in reflective and/or transmissive applications.

SUMMARY OF THE INVENTION

Herein is provided a novel system and method for reflecting and transmitting light at variable intensity by providing an electronically dimmable optical device. Such a device includes the following layers in sequence: an active absorbing polarizer, a first static reflective polarizer, an active polarization rotator, and a second static reflective polarizer. The layers are configured such that the reflectivity and/or transmissivity of the device can be controlled (increased or decreased) by application of a voltage across the active absorbing polarizer and the active polarization rotator.

When the device is used as a reflective device, it can further include a beam stop adjacent the second static reflective polarizer to minimize or eliminate any further reflection of light that reaches it.

In some embodiments, the device can further include a static polarization rotator.

The devices described herein may be either of rigid construction (e.g. using glass substrates) or flexible (e.g. using plastic substrates or the like).

In one embodiment, the optical device configuration is as follows: (a) the active absorbing polarizer has an absorptive axis in an x-direction when activated by application of a voltage, (b) the first static reflective polarizer has a reflective axis in the x-direction, (c) the active polarization rotator rotates the polarization axis of incident light by 90° when activated by application of a maximum voltage, and (d) the second static reflective polarizer has a reflective axis in a y-direction, so that upon application of the voltage, the reflectivity of the optical device is reduced. The level of reflectivity of the device can be varied by applying a variable voltage between a zero voltage and maximum voltage settings.

In another embodiment, the optical device configuration is as follows: (a) the active absorbing polarizer has an absorptive axis in an x-direction when activated, (b) the first and second static reflective polarizers have a reflective axis in the x-direction, (c) the active polarization rotator rotates the polarization axis of incident light by 90° when in a non-activated state, so that upon application of the voltage, the reflectivity of the optical device is reduced. The level of reflectivity of the device can be varied by applying a variable voltage between a zero voltage and maximum voltage settings.

In some embodiments, the device is a dimmable mirror that reflects a selective wavelength of visible spectrum.

In some examples, the device is a dimmable mirror that absorbs a selective wavelength of the visible spectrum.

As a transmissive device, the device can have minimum transmissivity when a maximum voltage is applied across the active absorbing polarizer and/or the active polarization rotator. Alternatively, in other embodiments, the device has maximum transmissivity when a maximum voltage is applied across the active absorbing polarizer and/or the active polarization rotator, but minimum transmissivity when the device is not activated by application of a voltage.

The reflectivity and/or transmissivity of any of the devices of the present invention can be controlled automatically, manually, or with a combination of both automatic and manual controls.

In some examples, the polarization level of the active absorptive polarizer is selected by controlling the voltage applied to the active absorptive polarizer. Accordingly, setting the active absorptive polarizer to the selected polarization level determines the brightness of the image produced by the device.

Thus, the device can further include a controller for application of voltage to the device and the controller is coupled with the active absorptive polarizer.

In some embodiments, the active absorptive polarizer is divided into two or more sections, and the controller sets each of the sections to a respective polarization level.

In further embodiments, the device includes at least one light detector, coupled with the controller, configured such that the light detector provides one or more light-intensity values. The controller then sets the active absorptive polarizer to the selected polarization level according to each light-intensity value.

Also contemplated herein is a reflective device or mirror, as described above, but which has in addition a display placed on the non-viewing side of the device or mirror, configured so that at least a portion of light emitted from the display is transmitted to a viewing surface of the optical device.

Any of the devices described above can be configured so that the device can reflect more than 50% of incident light when it is in its maximum reflectivity state. In some examples, the device's reflectivity can be more than 60%, 70%, 80% or 90% when in its maximum reflectivity state.

The device can also be configured so that the swing (or contrast) between its maximum and minimum reflective states is more than 50%. In some example, the swing or contrast is more than 60%, 70% or 80%. The device can also be configured to reflect less than 30%, 20% or 10%, or any number in between, of incident light when it is in its minimum reflectivity state.

Any of the reflective devices described above can be used as a rearview or side-view mirror of a vehicle, airplane, or used in any similar application where a dimmable mirror is desirable.

In other example, any of the transmissive devices described above can be used in windows, visors, helmets, etc, or used in any similar application where a dimmable transmissive device is desirable.

Also contemplated herein is a method of reducing light reflected from an optical device, where the method includes using any of the optical devices described above and applying a voltage to the optical device to alter the reflectivity of the device.

In some embodiments, the method includes: directing incident light toward a viewing surface of a device having an active absorptive polarizer at its viewing surface, followed by a first static (non-switchable) reflective polarizer, an active (electrically switchable) polarization rotator, and a second static (non-switchable) reflective polarizer. The layers are configured such that the device has maximum reflectivity when the device is in an unenergized state and minimum reflectivity when the device is activated by a maximum voltage applied to the active polarizer and the active polarization rotator.

In other embodiments, the layers are configured such that the device has minimum reflectivity when the device is in an unenergized state and maximum reflectivity when the device is activated by a maximum voltage applied to the active polarizer and the active polarization rotator.

In some example, the method includes: setting the active polarizer to be in a non-absorptive state when not energized, and to absorb an x-direction polarization of incident light and transmit a y-direction polarization when energized by application of a voltage; setting the first reflective polarizer to reflect the same x-direction polarization that the active polarizer absorbs; setting the second reflective polarizer to reflect the orthogonally opposite y-direction polarization of light; and setting the active polarization rotator to have no effect when non-energized and to rotate the polarization direction of light by up to 90° when energized by a maximum voltage. The level of reflectivity of the device can be varied by applying a variable voltage between a zero voltage and maximum voltage settings.

In other example, the method includes: setting a viewing surface active polarizer to be in a non-absorptive state when not energized, and to absorb an x-direction polarization of incident light and transmit a y-direction polarization when energized by application of voltage; setting the first and second static reflective polarizers to reflect said x-direction polarization of light; and setting the active polarization rotator to have no effect when energized by a maximum voltage but to rotate the polarization direction of light by 90° when in a non-energized state. The level of reflectivity of the device can be varied by applying a variable voltage between a zero voltage and maximum voltage settings.

Other features, details, utilities, and advantages of the present invention may be apparent from the following more particular written description of various embodiments of the invention as further illustrated in the accompanying drawings and defined in the appended claims.

BRIEF DESCRIPTION OF THE DRAWINGS

Features and advantages of the invention will become apparent from the following detailed description made with reference to the accompanying drawings, wherein.

BEST MODE FOR CARRYING OUT THE INVENTION

Figure 1:
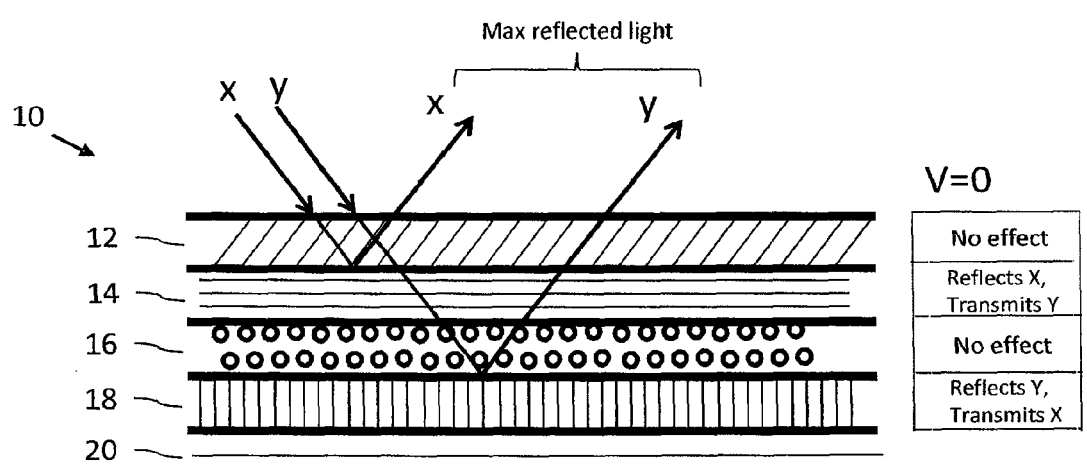
FIG. 1 is a schematic cross-sectional view of a portion of an optical device according to a first embodiment when the device is in a voltage OFF state.

Herein described is an electronically dimmable optical device having, in sequence, the following layers: an active (electrically switchable) absorptive polarizer, a first static (non-switchable) reflective polarizer, an active (electrically switchable) polarization rotator, and a second static (non-switchable) reflective polarizer. The device is configured so that the reflectivity of the device can be controlled by application of a voltage to the active layers.

In one embodiment, the device is primarily a reflective device and can additionally include a beam stop.

In some embodiments, the layers are configured so that the device, when in an unenergized state, will reflect substantially all incident light ("clear mirror state"), but when energized, will absorb a portion of incident light, leading to a dimmed reflected image ("dark mirror state"). In some embodiments, when a maximum voltage is applied, the device can be made to substantially absorb 100% of incident light.

Accordingly, in case of a reflective device such as a mirror, with the application of a fixed or variable voltage, the mirror will have one or more variable reduced reflectivity states, where it will absorb a variable portion (up to substantially all) of the x and y direction polarization of the incident light.

In a transmissive device embodiment (such as a window, visor, helmet, view finder of a camera, etc.), the device will not include a beam stop, so that a viewer is able to see though the device.

It should also be noted that in the transmissive device, the device may be used in either direction, i.e. the active polarizer layer may be adjacent the entrance surface of the device or, vice versa, the second passive reflective layer may be adjacent the entrance surface.

In a transmissive embodiment, the active polarizer and active polarization rotator may be constructed so that the device is most transmissive when no voltage is applied, and is most reflective when a voltage is applied. However, in other embodiments, the reverse can be the case, so active layers are constructed in a way that makes the device most transmissive when a voltage is applied and most reflective (has reduced transmissivity) when no voltage is applied (unenergized state).

When used as a transmissive device, the application of a fixed or variable voltage will alter the amount of light that passes through the device to reach a viewer.

The voltage applied to the dimming device assembly can control the dimming effect and can be regulated in a manner such that the reflectivity, or transmissivity, of the device is reduced to suit the prevailing conditions. This can be accomplished manually or automatically, by using one or more light sensors connected to an electric control system which react either to the brightness of the surroundings, or the intensity of the light incident on the front of the device, or both. Thus, the amount of dimming may be varied either manually, automatically, or both.

In accordance with a further aspect of the invention, there is provided a method for reflecting light at variable intensity by application of a voltage to an electronically dimmable optical device. The method includes the process of directing incident light toward a device having an active absorptive polarizer at its viewing surface, followed by a first static (non-switchable) reflective polarizer, an active (electrically switchable) polarization rotator, and a second static (non-switchable) reflective polarizer and finally a beam stop, configured such that when the device is in an unenergized state, substantially all of the light incident on the viewing surface is reflected, but when a maximum voltage is applied to the active polarizer and the active polarization rotator, substantially all of the light incident on the viewing surface is absorbed, thus reducing the intensity of the reflected light. The level of reflectivity of the device can be varied by applying a variable voltage between a zero voltage and maximum voltage settings.

In accordance with another aspect of the invention, there is provided a method for transmitting light at variable intensity by application of a voltage to an electronically dimmable optical device. The method includes the process of directing incident light toward a device having an active absorptive polarizer adjacent a first static (non-switchable) reflective polarizer, adjacent an active (electrically switchable) polarization rotator, adjacent a second static (non-switchable) reflective polarizer, and applying voltage to the device to alter the amount of light transmitted or reflected by the device.

In some embodiments of the transmissive method, the configuration of the layers is such that the method includes directing incident light toward an active absorptive polarizer layer first, before it passes though the other layers (i.e., the active absorptive polarizer is adjacent the entrance surface of the device). In other embodiments, the configuration of layers is such that the method includes directing incident light toward the second reflective polarizer first, before it passes though the other layers (i.e. the second reflective polarizer is adjacent the entrance surface of the device).

In some embodiments, the method includes reducing the transmissivity of the device by applying a voltage, so that when the device is in an unenergized state, a portion of the light incident on the entrance surface is transmitted through the device, but when a maximum voltage is applied to the active polarizer and/or the active polarization rotator, substantially all of the light incident on the entrance surface is reflected, thus reducing the intensity of the transmitted light.

In other embodiments, the method includes increasing the transmissivity of the device by applying a voltage, so that when the device is in an energized state, a portion of the light incident on the entrance surface is transmitted through the device, but when no voltage is applied to the active polarizer and/or the active polarization rotator, substantially all of the light incident on the entrance surface is reflected, thus reducing the intensity of the transmitted light.

The level of transmissivity of the device can be varied by applying a variable voltage between a zero voltage and maximum voltage settings.

It should be noted that when the different layers are described as "adjacent" one another, it is referring to the sequence of layers. Thus, it may be possible for other layers, films or materials to be interposed between the active polarizer, first passive reflective polarizer, active polarization rotator and second passive reflective polarizer layers without disturbing the sequence of their arrangement. For example, an adhesive or other layer or film may be disposed between the different layers.

In some embodiments, the method includes the following configuration: setting an active polarizer to be in a non-absorptive state when not energized, and to absorb a portion of the x-direction polarization of incident light and transmit the y-direction polarization when energized by application of a voltage. Setting the first and second static reflective polarizers to reflect different 90° polarizations of light, such that the first reflective polarizer will reflect the same direction polarization that the active polarizer absorbs (i.e. the x-direction polarization) and the second reflective polarizer will reflect the orthogonally opposite direction polarization of light (i.e. the y-direction polarization). The method further includes setting the active polarization rotator to have no effect when non-energized but to rotate the polarization direction of light by up to 90° (i.e. x to y or y to x) when energized. This configuration will effectively reflect substantially 100% of light incident on a device's viewing or entrance surface when no voltage is applied. The level of reflectivity of the device can be varied by applying a variable voltage between a zero voltage and maximum voltage settings.

In other embodiments, the method includes the following configuration: setting the viewing or entrance surface active polarizer to be in a non-absorptive state when not energized, and to absorb a portion of the x-direction polarization of incident light and transmit the y-direction polarization when energized by application of a voltage. Setting the first and second static reflective polarizers to reflect the same x-direction polarization of light. The method further includes setting the active polarization rotator to have no effect when energized by a maximum voltage but to rotate the polarization direction of light by 90° (i.e. x to y or y to x) when in a non-energized state. This configuration will also effectively reflect substantially 100% of incident light on a device's viewing or entrance surface when a maximum voltage is applied. The level of reflectivity of the device can be varied by applying a variable voltage between a zero voltage and maximum voltage settings.

In some embodiments of the reflective device according to the invention, the device will have the ability to reflect from substantially 100% of incident light (when V=0 or when the mirror is "clear") to substantially 0% of the incident light (when Vmax is applied or when the mirror is "dark"), or any % of light when in a variable in-between state. Thus the reflectivity swing (or contrast) between the maximum and minimum reflective states can be set to be more than 50%. This is because the mirror is able to reflect more than 50% of incident light when it is in its maximum reflectivity state. This effect is not achievable when a regular polarizer is used with a mirror (as in some prior art devices) because the polarizer will effectively absorb 50% of incident light, thus always less than 50% of the incident light will be reflected.

It is also noteworthy that the present arrangement allows for use of a display behind the reflective device or mirror. Thus, also contemplated herein is a device and method which further include allowing a display light emitted from a display device placed on the back surface of the mirror to be transmitted to the viewing surface of the mirror.

In some embodiments, to achieve this effect, a portion of the conductive layer (such as the ITO, etc.) that is applied to the active polarizer, the active polarization rotator or both, can be etched away or otherwise removed in such a manner, so that two regions are present that can operate independently. Therefore, when a voltage is applied to one region, dimming the mirror's reflectivity in that region, the display light from the other region is not affected or dimmed if so desired. Accordingly, in some examples, the active absorptive polarizer is divided into two or more sections, and the controller sets each of the sections to a respective polarization level. In some examples, the display area is smaller than, and occupies a small portion, of the viewing surface of the mirror.

Alternatively, the mirror can have a display region without the need for etching of the conductive layer(s). In such an embodiment, the reflectivity of the mirror is decreased and the display light is transmitted to the viewing surface with the application of voltage. Accordingly, not only is it possible to use only a portion of the viewing area of the mirror for display purposes, but it is possible to use the entire viewing area of the mirror to display an image (see, e.g. FIGS. 5-6).

The display can be tuned so that it can be visible when the mirror is in its minimum reflective state, when the mirror is in its most reflective state, and/or while the mirror is in an intermediate reflective state, or any combination of the above.

DEFINITIONS

Unless specifically defined otherwise herein, the definitions for optical parameters such as linear, circular and unpolarized light are the same as those in "*Principles of Optics Electromagnetic Theory of Propagation, Interference and Diffraction of Light*", Max Born, et al., Cambridge University Press; 7th edition (Oct. 13, 1999). Similarly, all liquid crystal terminology which is not specifically defined herein is to have the definition as used in *Liquid Crystals Applications and Uses*, vol. 3, edited by B. Bahadur, published by World Scientific Publishing Co. Pte. Ltd., 1992 ("Bahadur").

An "absorptive polarizer" is a polarizer that will absorb a selected polarization of light. An absorptive polarizer will have two axes, an absorptive axis and a transmissive axis, which are at right angles to each other. The polarization of the light that is parallel to the absorptive axis is absorbed more than the polarization parallel to the transmissive axis.

For example, an "absorptive polarizer with an axis in the x-direction" means that the polarizer will substantially absorb the x-direction polarization of light while substantially allowing y-polarization to propagate. Vice versa, an absorptive polarizer with an axis in the y-direction means that the polarizer will substantially selectively absorb y-polarized light and substantially transmit x-polarized light.

It should be noted that absorptive circular polarizers exist and are typically constructed by using a linear polarizer in combination with a quarter wave retarder. Once light is polarized by the polarizer, the quarter wave plate induces a $\pi/2$ phase retardation which turns a linear polarization to a circular polarization.

An "active" polarizer, used interchangeably with an "active absorptive polarizer", refers to a polarizer that will alter its absorption of the selected polarization of light depending on the applied voltage. Thus, when in an unenergized or non-active state, the polarizer will not preferentially absorb either polarization and will transmit light of either polarization.

A controller coupled with the active polarizer controls the polarization: in one embodiment, the polarizer is operated in an ON or OFF state. In other embodiments, the polarizer can be set to apply a variable polarization absorption level with the controller setting a selected polarization level. In some example, the polarization level of the active absorptive polarizer is selected by controlling the voltage applied to the active absorptive polarizer. Accordingly, setting the active absorptive polarizer to the selected polarization level determines the brightness of the image produced by the device. Thus, the device can further include a controller for application of voltage to the device and the controller is coupled with the active absorptive polarizer.

The reflectivity and/or transmissivity of the devices o can be controlled automatically, manually, or with a combination of both automatic and manual controls.

A "reflective polarizer" is a polarizer that will reflect a selected polarization of light more than the other. For example, a "reflective polarizer with a reflective axis in the x-direction" means that the reflective polarizer will reflect the x-direction polarization of incident light more than the other y-direction polarization. Vice versa, a "reflective polarizer with a reflective axis in the y-direction" means that the reflective polarizer will reflect the y-direction polarization of incident light more than the other x-direction polarization A "passive" or "static" reflective polarizer will always have the same reflective properties, whether voltage is applied to the device or not.

An "active polarization rotator" refers to a device where application of a voltage to the device alters the polarization direction of two linearly polarized components of the incoming light by a value between 0 and 90°, changing it so that light exiting the polarizer rotator is changed from a substantially first direction to a substantially second direction polarization within a selected wavelength region. Thus, for example, an x-direction polarized light entering the polarizer rotator will be turned into a y-direction polarized light before exiting the rotator, and vice versa, a y-direction polarization will be turned into an x-direction polarized light when a maximum voltage is applied. The fully activated active polarizer rotator described herein will rotate the polarization direction of the light by 90°, and as such, acts like a half wave, ½ $\lambda$, plate.

As described herein, the active polarization rotator may function in two ways: in some examples, polarization rotation occurs when the rotator is in the energized state, in other examples, polarization rotation occurs when the rotator or device is in an unenergized (non-activated) state.

A controller coupled with the active polarization rotator alters the amount of one polarization with respect to the other. In the extreme case, the polarization would be rotated by a full 90 degrees. However, intermediate states can be achieved by using voltages which are between the zero and max voltage states.

The term "viewing surface" refers to the front surface of a mirror and is the surface closest to the viewer's eye. In contrast, the "non-viewing" side of a mirror refers to the back of the mirror.

In a transmissive device, the term "entrance surface" refers to the surface of the device where incident light (e.g. sunlight) enters the device. In the case of a window, the entrance surface is the outside surface of the mirror.

The terms "x" and "y" direction polarization are arbitrary and refer to a first and second orthogonal or circular polarization direction of light which are at right angles to each other. They are used, instead of stating for example a "first" and a "second" polarization direction only to simplify the description of the invention do not refer to any fixed values of direction.

Conventionally, properties of a light are characterized by its (i) propagation direction, denoted by the wave vector, K, (ii) wavelength denoted by $\lambda$, (iii) two orthogonal polarizations direction, $P_1$ and $P_2$, (iv) polarization mode, which can be unpolarized, circular/elliptical or linear, and (iv) by energy being carried within each polarization, denoted here by $I_1$ and $I_2$.

Generally, the term polarization refers to the oscillation direction of the electric field of the incident light. The difference between linear, circular and unpolarized light is in how a unique representation of the polarization is determined. In particular, in linearly polarized systems, the oscillation occurs in a single axis direction, x or y. In circularly polarized light, the oscillation rotates in time or space tracing out a circle or ellipse. In unpolarized light, the oscillation direction cannot be uniquely defined. Unpolarized light is viewed as a light in which (i) there is an equal amount of both orthogonal polarizations and (ii) the direction of the polarization at any given time is random and cannot be defined.

It is well known that unpolarized light can be identically viewed as composed of two orthogonal, circularly polarized lights (right- or left-handed) or of two orthogonal linearly polarized lights (x and y direction). In a rear-view mirror embodiment, since light from head lamps are typically unpolarized, a dimming mirror should preferably be capable of reducing the energy in both polarizations. In this application, for descriptive purposes, light is referred to as polarized in two directions to simplify the explanation of how the device works. It should be understood, however, that the devices and principles described herein will apply to all light. "Light" in this application refers to visible light with a wavelength of about 380-750 nm.

As presented herein, the unpolarized light is considered to be composed of two linear polarizations in an x and a y direction and propagating in a z direction. Furthermore, it is noted that a reflective polarizer has also two axes, x and y. The reflective polarizer operates in a manner such that if the polarization axis of the light matches the axis of the reflective polarizer, then that polarization is predominantly reflected. If the polarization axis of the light is perpendicular to that of the reflective polarizer, then that component is predominantly transmitted.

It is noted that in the case of circular light, the x and y refer to the handedness of the polarization rather than fixed directions in space. Therefore x, for example, will denote right circular and y will denote left circular. As in the case of linearly polarized light, the unpolarized light will be considered to be composed of equal amounts of left and right circularly polarized amounts. The reflective polarizer, in that case, will reflect either the right- or the left-circular polarization depending on its configuration and will transmit the other polarization, left- or right-, respectively.

The reflective polarizer is considered to be "static" or "passive" in that its polarizing characteristics cannot be altered by application of a voltage.

In the devices described herein, a switchable polarizer can be provided by a using a Guest-Host system: dichroic dye molecules are dissolved in a nematic or chiral nematic liquid crystal (LC) layer. The dye molecules (Guest) are oriented by the presence of the LC molecules (Host). Applying an electric field to the layer will re-orient the LC molecules and the dye molecules will follow this re-orientation. Such a stack will either absorb light of one polarization or be transparent. Suitable dyes that can be added to liquid crystal mixtures for this purpose are known in the art. The degree of preferential absorption of one polarization with respect to the other is dependent on the applied voltage.

The absorptive polarizer of the present invention is assumed to be active in that its polarizing/absorptive properties can be altered by application of an external electrical field (voltage). Furthermore, this active polarizer is based on a guest-host liquid crystal system or cell that includes a negative dielectric anisotropy host combined with a positive dichroic dye in a homeotropically aligned cell. Alternatively, a positive dielectric anisotropy host can be used with positive dichroic dyes in a plannar aligned cell. For autodimming reflective devices such as those used in the automobiles, the homeotropic based system is better suited to provide substantially 100% reflectance in the voltage off state. The liquid crystal cell is designed such that application of a voltage results in a change in transmission of the light through the cell. More specifically, application of a voltage will preferentially increase the absorption of one polarization more than the other. The axis of the preferentially absorbed polarization matches the absorptive axis of the active polarizer.

The "polarization rotator film" or layer, which rotates the polarization of incident light as it propagates through the medium, can be a broad band rotator device such as a twisted nematic (TN)-based device or a more wavelength selective device as used in electronically controlled birefringence (broadly classified as ECB)-based devices. This film is assumed to be active in that its performance depends on an applied voltage. It is well known that for the correct performance, the axis of the polarization rotator will be at a specific angle relative to the axis of the polarization of the light. For example, in a broad band device, the axes of the TN are parallel to the polarization axes of the incident light. The polarization rotator can be designed so that it performs the polarization rotation when activated by application of an electric field or voltage. This is achieved by, for example, using negative dielectric anisotropy liquid crystals along with a homeotropic alignment layer, or vice versa by using a positive dielectric anisotropy liquid crystal and a planar alignment layer. In general, the application of voltage alters the orientation of the liquid crystal and hence the overall birefringence of the system. This change can be positive in the former or negative in the latter. Therefore, for example, in a positive dielectric anisotropy liquid crystal and a planar alignment layer, application of voltage reduces the birefringence observed by different polarizations and hence reduces the phase retardation between the two polarizations. If the birefringence is substantially close to zero at maximum applied voltage, then no phase retardation is observed and hence no polarization rotation occurs in the cell.

The active polarization rotator is defined such that the polarization rotation occurs in the energized state as PR1 and the active polarization rotator in which the polarization rotation occurs in the unenergized state as PR2. It is well known in the art that to achieve proper polarization rotation, the birefringence and the thickness of the layer must be properly selected as discussed in, for example, *Liquid Crystals Applications and Uses*, vol. 3, edited by B. Bahadur, published by World Scientific Publishing Co. Pte. Ltd., (1992). The choice in use of a TN-type configuration or ECB-type depends on the device preference such as color selectivity but will not alter the overall configuration schematic presented.

A beam stop layer can be utilized for the reflective embodiments, such as, e.g. in autodimming mirror applications. This can be any material which has low reflectance and predominantly absorbs the light that impinges upon it from the other layers stated above. Its function is to stop additional reflection of any portion of the light reaching it once it passes the last optical element. Examples of this include tinted paper or other materials, absorbers, polarizers and the like.

In some applications, it is desirable to have a dimming mirror that can also be used for display purposes, where in addition to the reflected image, a displayed image from a backlight display device is visible to a viewer. Accordingly, another embodiment of the dimming mirror includes a display device placed on at least a portion of the mirror's non-viewing side so that part of the mirror is used as a display (the "display area") while the reflective function remains in the remainder part of the mirror (the "reflective area"). The beam stop layer may, itself, have the additional function of displaying an image, or may have a polarization dependent performance. In some embodiments, the display area is smaller than the reflective area. In other embodiments, the display area covers the entire reflective area. The mirror can be configured so that when the display device is in use, at least a portion of light emitted from the display is transmitted to the display area portion of the viewing surface of the mirror.

In other aspects, the transparent conductor layer(s) may be etched in a pattern that will allow independent driving of the two or more different regions of the mirror. In that case, part of the mirror may be in one operational state while the other sections remain in a different state. The etched pattern can be selected to expose the display area or an image or writing or alike.

Some proposed configurations for an electronically dimmable optical device are presented below. There are several geometries that can be utilized depending on the performance desired. For the sake of illustration, linearly polarized systems are used but it should be noted that polarizers and active phase retarders can be used to allow for circularly or other polarization modes of light to be utilized according to the same principles.

EXAMPLE 1

Figure 2:
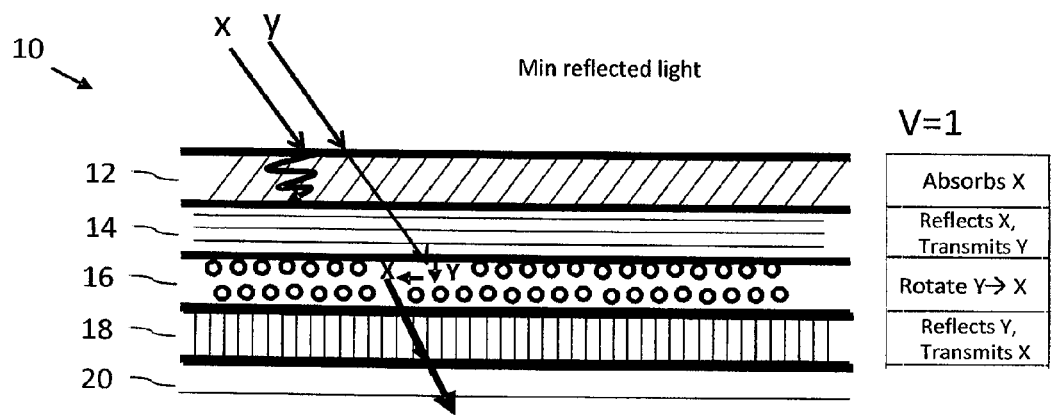
FIG. 2 is a schematic cross-sectional view of a portion of the optical device according to the first embodiment when the device is in a maximum voltage ON state.

FIGS. 1 and 2 show a first configuration assembly 10, which is designed for a dimming system and comprises of the following layers: an active polarizer 12 with an absorptive axis in the x-direction (when activated) at the viewing surface 13 of the device, adjacent a static reflective polarizer 14 with a reflective axis in the x-direction, adjacent an active polarization rotator 16, adjacent a static reflective polarizer 18 with a reflective axis in the y-direction. It should be noted that the active polarizer and the active polarization rotator may be independently operated.

FIG. 1 and Table 1 show the device functioning in an OFF (V=0 or voltage-off) state. Unpolarized light 30 with both x and y polarizations is incident on the first active absorptive polarizer 12 oriented in the x-direction. With no voltage applied, the active absorptive polarizer 12 will have minimal effect on the incident polarizations. Therefore, both polarizations will predominantly pass through to the next surface. The light then impinges on the 1st static reflective polarized 14 oriented in the x-direction. The reflective polarizer 14 predominantly reflects the x-axis polarization of the light and predominantly transmits the y-direction polarization. The x-direction polarized light goes back through the active polarizer 12 unaltered and leaves the device. Therefore, approximately 50% of the incident unpolarized light is reflected within the first two layers. The y-direction polarized light that passed the first reflective polarizer 14 impinges on the active "polarizer rotator" or PR 1 (16). As stated before, PR1 (16) does not alter polarization when in an unenergized state. Therefore the y-direction polarized light continues to the second static reflective polarizer 18. This polarizer is oriented in the y-direction and as such it will reflect the y-polarized light back. This reflected light goes through the polarizer rotator 16 again unaffected and continues to static reflective polarizer 14, which is oriented in the x-direction. Again, the y-direction polarized light is transmitted back through the static reflector 14. Since the active polarizer 12 is in an unenergized state, the y-direction polarized light continues through that layer and leaves the device. This means that the remaining 50% of the incident light is also reflected but after it traverses to the second reflective polarizer 18. Overall, both the x-direction and the y-direction polarized lights are predominantly reflected in the voltage-off state (close to 100% reflection).

FIG. 2 and Table 2 show device functioning in a Maximum Voltage (Vmax or V=1) state. Unpolarized incident light with both x and y polarization is incident on the first active absorptive polarizer 12 oriented in the x-direction. When a voltage is applied, the active absorptive polarizer 12 will behave in a manner similar to a conventional polarizer. Therefore, it will absorb x-direction polarization while allowing y-polarization to propagate. The first static reflective polarizer 14 will reflect any x-direction polarization. Therefore, x-polarization of the light 30 is predominantly extinguished. The y-direction polarization will be transmitted predominantly by both the first active polarizer 12 as well as the first static reflective polarizer 14. It then impinges on an activated polarization rotator 16. The polarization rotator 16 will rotate the propagating y-direction polarization to an x-direction polarization light. This x-direction polarized light then impinges on the second static reflective polarizer 18 which is set in the y-direction and therefore transmits x-direction polarized light. As such, the resultant x-direction polarization light is predominantly propagated through.

In a reflective (e.g. mirror) application, a beam block 20 can be used to extinguish this transmitted light. Therefore, both the x-direction and the y-direction polarization lights are predominantly absorbed and no light, or only a minimal amount of light, is reflected back from the device.

In a transmissive application, approximately 50% of light is transmitted through.

If a voltage lower than the Vmax is used on either the active polarizer 12 or the polarization rotator 16, a portion of light is reflected depending on the voltage applied. As such the device can have a variable reflectance (in the case of a reflective device) or a variable transmittance (in the case of a transmissive device).

Many types of polarizer rotator 16 may be used. For example, either a TN-type or an ECB-type rotator can be used in the assembly 10. If an ECB-type rotator is used instead of the TN-type polarization rotator, a portion of the y-axis polarization light is reflected. The portion depends on the wavelength since complete polarization rotation will not occur across the entire visible spectrum. As such, there may be a hue to the reflection observed from such a dimming device. As before, application of a voltage lower than the max to the active polarizer 12 or the polarization rotator 16 can alter either the intensity or shift the color to a different region of the spectrum.

TABLE 1

Device in its inactive, maximum reflectivity state (V = 0)

| Active Polarizer | First Reflective Polarizer | Active Polarization rotator | Second Reflective Polarizer | Beam Stop |
|---|---|---|---|---|
| No effect | Reflect X Transmit Y | No effect | Transmit X Reflect Y | Absorbs all light |
| Transmits both polarizations | Reflects X | Transmits both polarizations | Reflects Y | |

TABLE 2

Device in its active, minimum reflectivity state (Vmax)

| Active Polarizer | First Reflective Polarizer | Active Polarization rotator | Second Reflective Polarizer | Beam Stop |
|---|---|---|---|---|
| Absorbs X Transmits Y Extinguishes X | Reflect X Transmit Y | Rotates 90° X→Y, Y→X Y→X | Transmit X Reflect Y Transmits X | Absorbs all light Extinguishes X |

EXAMPLE 2

Figure 3:
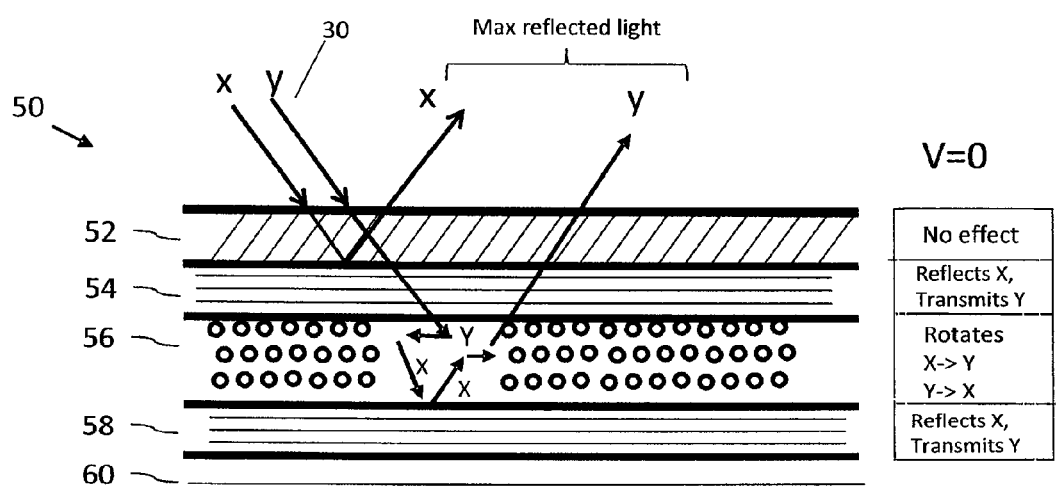
FIG. 3 is a schematic cross-sectional view of a portion of an optical device according to a second embodiment when the device is in a voltage OFF state.
Figure 4:
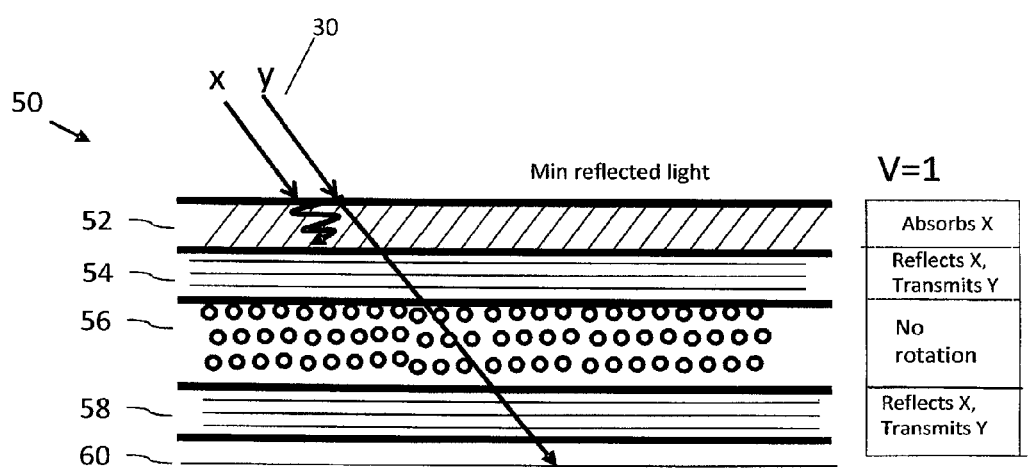
FIG. 4 is a schematic cross-sectional view of a portion of the optical device according to the second embodiment when the device is in a maximum voltage ON state.

In another embodiment, shown in FIGS. 3 and 4, a second configuration designed for a dimming system is shown. The system 50 includes: an active polarizer 52 with absorptive axis in the x-direction when activated, adjacent a first static reflective polarizer 54 with a reflective axis in the x-direction, adjacent an active polarization rotator 56, followed by a second static reflective polarizer 58 with reflective axis in the x-direction. It should be noted that the active polarizer 52 and the active polarization rotator 56 may be independently operated.

FIG. 3 and Table 3 show the device functioning in an OFF (v-0 or the voltage off) state. Unpolarized light 30 with both x and y polarization is incident on the first (active absorptive polarizer) oriented in the x-direction. With no voltage applied, the active absorptive polarizer 52 will have minimal effect on the incident polarizations. Therefore, both polarizations will predominantly pass through to the next surface. The light then impinges on the $1^{st}$ static reflective polarizer 54 oriented in the x-direction. The reflective polarizer 54 predominantly reflects x-axis polarization of the light and predominantly transmits the y-direction polarization. The x-direction polarized light goes back through the active polarizer 52 unaltered and leaves the device. Therefore, approximately 50% of the unpolarized light is reflected within the first two layers. The y-direction polarized light passes through the first reflective polarizer and impinges on the active polarization rotator 56. When no voltage is applied, the polarization rotator (PR2) 56 alters the polarization. Therefore the y-direction is now oriented to x-direction polarized light and continues to the second static reflective polarizer 58. The second reflective polarizer 58 is oriented in the x-direction and as such it will reflect the x-polarized light back. This light goes through the polarization rotator 56 and is again altered to Y direction. The y direction light continues to the first static reflector 54, which is oriented in the x-direction and will transmit the y-direction polarized light. Since the active polarizer 52 is in an OFF state, the y-direction polarized light continues though that layer and leaves the device. This means that the remaining 50% of the light is also reflected but after it traverses to the second reflective polarizer 58. Overall, both the x-direction and the y-direction polarized lights are predominantly reflected in the voltage off state.

FIG. 4 and Table 4 show the device 50 functioning in a Maximum Voltage (Vmax or V=1) minimum reflectivity state. Unpolarized light with both x and y polarization is incident on the active absorptive polarizer 52 oriented in the x-direction. With a voltage applied, the active absorptive polarizer 52 will behave in a manner similar to a conventional polarizer, which means it will absorb x-direction polarization while allowing y-polarization to propagate. Therefore, x-polarization of the light is predominantly extinguished. The y-direction polarization will be transmitted predominantly by both the first active polarizer 52 as well as the first static reflective polarizer 54. It then impinges on an activated polarization rotator 56. The polarization rotator in its active state will not rotate the polarization and so the y-direction polarization light will pass through unaffected. This y-direction polarized light then impinges on the second static reflective polarizer 58 which is set in the x-direction. As such, the y-direction polarization light will pass thorough.

In a reflective (e.g. mirror) application, a beam block 20 can be used to extinguish this transmitted light. Therefore, both the x-direction and the y-direction polarization lights are predominantly absorbed and no light, or only a minimal amount of light, is reflected back from the device.

In a transmissive application, approximately 50% of light is transmitted through.

If a voltage lower than the Vmax is used on either the active polarizer 12 or the polarization rotator 16, a portion of light is reflected. As such the device can have a variable reflectance (in the case of a reflective device) or a variable transmittance (in the case of a transmissive device).

TABLE 3

Device in its inactive, maximum reflectivity state (V = 0)

| Active Polarizer | First Reflective Polarizer | Active Polarization rotator | Second Reflective Polarizer | Beam Stop |
|---|---|---|---|---|
| No effect Transmits both polarizations | Reflect X Transmit Y Reflects X | Rotates 90° X→Y, Y→X Y→X Y←X | Reflect X Transmit Y Reflects X | Absorbs all light ← |

TABLE 4

Device in its active, minimum reflectivity state (Vmax)

| Active Polarizer | First Reflective Polarizer | Active Polarization rotator | Second Reflective Polarizer | Beam Stop |
|---|---|---|---|---|
| Absorbs X Transmits Y Extinguishes X | Reflect X Transmit Y Transmits Y | No effect Transmits Y | Reflect X Transmit Y Transmits Y | Absorbs all light Extinguishes Y |

EXAMPLE 3

Figure 5:
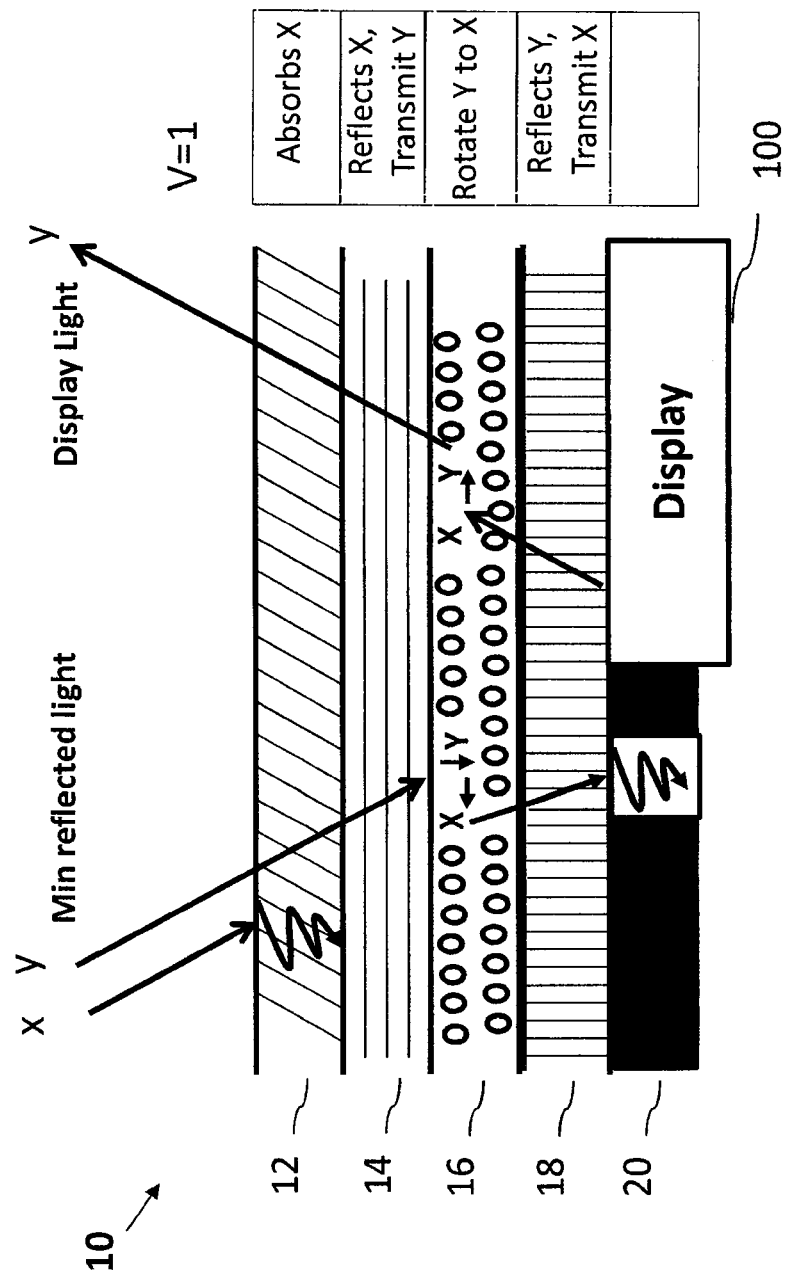
FIG. 5 is a schematic cross-sectional view of a portion of an electronically dimmable mirror used with a display.

FIG. 5 shows a configuration of a mirror device corresponding to the that shown in Example 1 but with the addition of a display device on the non-viewing side of the mirror.

FIG. 5 shows how when a maximum voltage is applied (Vmax), the x-direction polarized light emitted from the display device 100 will be transmitted through the second static reflective polarizer 18 to the polarization rotator 16, which will rotate the polarization direction of the light to a y-direction. This y-direction light will then pass through the first static reflective polarizer 14 and the active polarizer 12 largely unaffected, to emerge through to the viewing surface 13 of the mirror 10.

In this configuration, the display light has the same polarization as the polarization axis of the absorptive polarizer.

EXAMPLE 4

Figure 6:
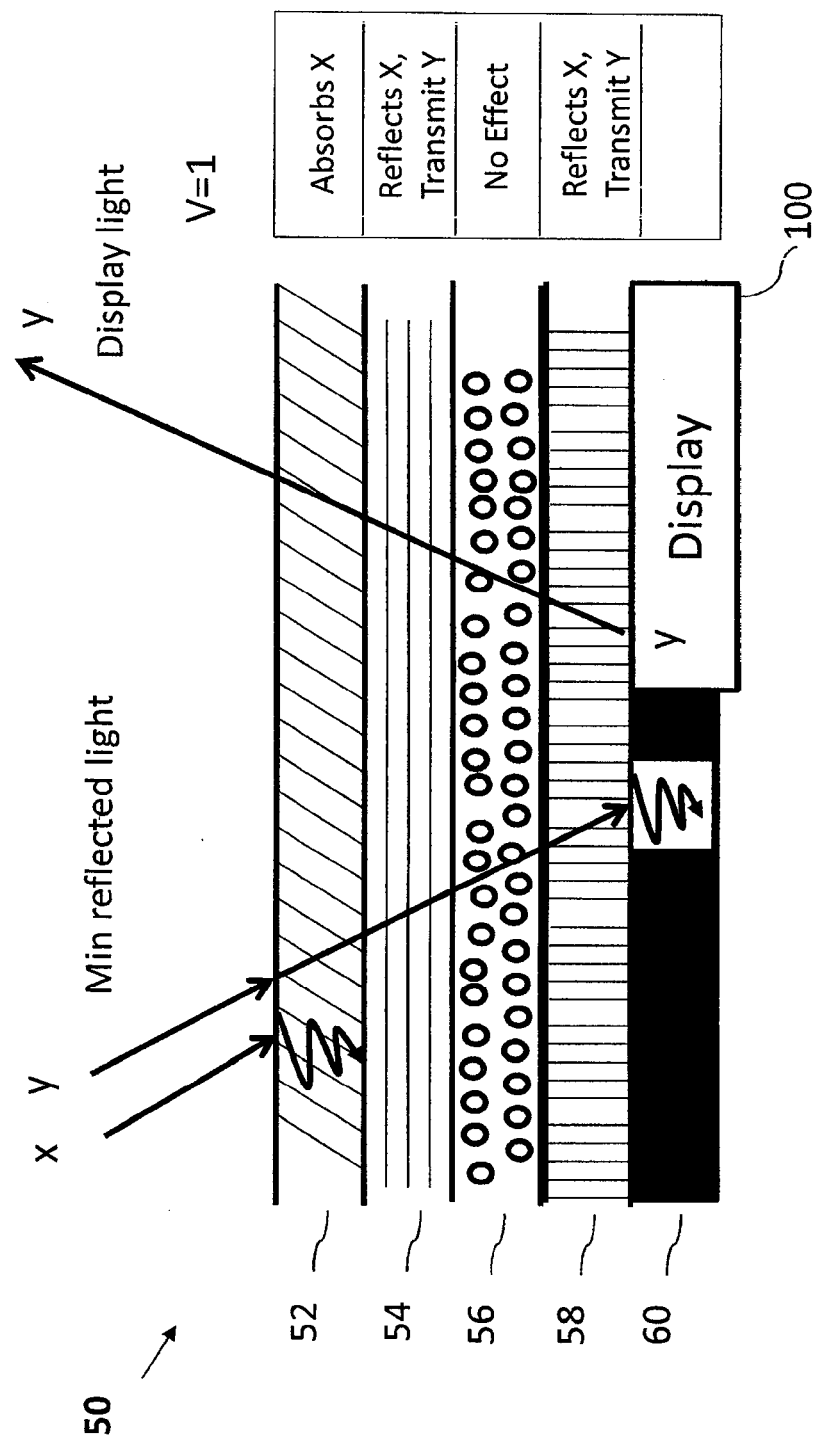
FIG. 6 is a schematic cross-sectional view of a portion of another example of an electronically dimmable mirror used with a display.

FIG. 6 shows a configuration of a mirror corresponding to the that shown in Example 2 but with the addition of a display device on the non-viewing side of the mirror.

FIG. 6 shows how when a maximum voltage is applied (Vmax), the y-direction polarized light emitted from the display device 200 will be transmitted through the second static reflective polarizer 58 to the polarization rotator 56, which will not affect the polarization direction of the light. This y-direction light will then pass through the first static reflective polarizer 54 and the active polarizer 52 largely unaffected, to emerge through to the viewing surface 53 of the mirror 50.

In this configuration, the display light has a polarization at right angles to the polarization axis of the absorptive polarizer.

It is noted that the dimmable mirror presently described can be used with various types of optical devices where attenuation of the reflectivity of the mirror is desired. Examples include general purpose mirror, vehicle (automotive) mirror, aircraft mirror, marine vehicle mirror, spacecraft mirror (e.g., rear-view mirror or side-view mirror), spectacles, binoculars, periscope, reflex camera, telescope, microscope, camera viewer (for locating an object before taking the picture of the object), view finder (for viewing an object while making a video recording of the object), and the like. It can also be used to block images or displays in applications such as mobile phone, LCDs, monitors, bill boards and the like.

Although the description above contains many specificities, and reference to one or more individual embodiments, these should not be construed as limiting the scope of the invention but rather construed as merely providing illustrations of certain exemplary embodiments of this invention. There are various possibilities for implementation of different materials and in different configurations and those skilled in the art could make numerous alterations to the disclosed embodiments without departing from the spirit or scope of this invention.

What is claimed is:

1. An electronically dimmable optical device, comprising:
   a. an active absorbing polarizer that is electronically switchable wherein said active absorbing polarizer alters absorption of a selected polarization of light depending on an applied voltage such that when in an unenergized state said active absorbing polarizer will transmit light of either polarization;
   b. a first static reflective polarizer;
   c. an active polarization rotator that is electronically switchable; and
   d. a second static reflective polarizer;
configured so that the device has maximum reflectivity when no voltage is applied to the active absorbing polarizer and minimum reflectivity when a maximum voltage is applied to the active absorbing polarizer.

2. The optical device of claim 1, wherein the device further comprises a beam stop adjacent the second static reflective polarizer to absorb any light that reaches the beam stop.

3. The optical device of claim 1, wherein
   a. the active absorbing polarizer has an absorptive axis in an x-direction when activated by application of a voltage,
   b. the first static reflective polarizer has a reflective axis in the x-direction,
   c. the active polarization rotator rotates the polarization axis of incident light by 90° when activated by application of a voltage,
   d. the second static reflective polarizer has a reflective axis in a y-direction, so that upon application of the voltage, the reflectivity of the optical device is reduced.

4. The optical device of claim 1, wherein
   a. the active absorbing polarizer has an absorptive axis in an x-direction when activated by application of a voltage,
   b. the first and second static reflective polarizers have a reflective axis in the x-direction,
   c. the active polarization rotator rotates the polarization axis of incident light by 90° when in a non-activated state,
   so that upon application of the voltage, the reflectivity of the optical device is reduced.

5. The optical device of claim 1, wherein the device is an electronically dimmable mirror that reflects a selective wavelength of visible light spectrum.

6. The optical device of claim 1, wherein the device is an electronically dimmable mirror that absorbs a selective wavelength of the visible light spectrum.

7. The optical device of claim 1, wherein the device is a transmissive device that has minimum transmissivity when the device is not activated by application of a voltage.

8. The optical device of claim 1, wherein the reflectivity of the device is controlled automatically, manually, or with a combination of both automatic and manual controls.

9. The optical device of claim 1, wherein the device reflects more than 50% of incident light when it is in its maximum reflectivity state.

10. The optical device of claim 1, wherein the swing between its maximum and minimum reflective states is more than 50%.

11. The optical device of claim 1, wherein the device reflects less than 20% of incident light when it is in its minimum reflectivity state.

12. The optical device of claim 1, wherein a selected polarization level is selected by controlling the voltage applied to said active absorptive polarizer and wherein setting said active absorptive polarizer to said selected polarization level determines the brightness of an image produced by said device.

13. The optical device of claim 1, further comprising a controller, controlling said active absorptive polarizer,
   wherein said controller is coupled with said active absorptive polarizer,
   wherein said active absorptive polarizer is divided into two or more sections, and
   wherein said controller sets each of said sections to a respective polarization level.

14. The optical device of claim 1, further comprising at least one light detector coupled with a controller, wherein said at least one light detector provides at least one light-intensity value, wherein said controller sets said active absorptive polarizer to a selected polarization level according to said at least one light-intensity value.

15. The optical device of claim 1, wherein the device further comprises a display placed on a non-viewing side of the optical device and wherein at least a portion of light emitted from the display is transmitted to a display area of a viewing surface of the optical device.

16. The optical device of claim 15, wherein the display area covers an entire surface of the viewing surface of the device.

17. The optical device of claim 15, wherein the display is tuned to be visible when the optical device is in its minimum reflective state, its most reflective state, in an intermediate reflective state, or any combination of the above.

18. The optical device of claim 1 for use as a rearview or side-view mirror of a vehicle.

19. A method of reducing light transmitted or reflected from an optical device, said method comprising using an optical device, comprising:
   a. an active absorbing polarizer that is electronically switchable wherein said active absorbing polarizer alters absorption of a selected polarization of light depending on an applied voltage such that when in an unenergized state said active absorbing polarizer will transmit light of either polarization;
   b. a first static reflective polarizer;
   c. an active polarization rotator that is electronically switchable; and
   d. a second static reflective polarizer;
and applying a voltage to one or both electronically switchable elements of said optical device to alter the amount of light transmitted or reflected by the optical device from a maximum reflection and minimum transmission when there is no voltage applied to a minimum reflection and maximum transmission when a maximum voltage is applied.

20. The method of claim 19, wherein the method comprises:

setting the active polarizer to be in a non-absorptive state when not energized, and to absorb an x-direction polarization of incident light and transmit a y-direction polarization when energized by application of a voltage, setting the first reflective polarizer to reflect the same x-direction polarization that the active polarizer absorbs, setting the second reflective polarizer to reflect the orthogonally opposite y-direction polarization of light, setting the active polarization rotator to have no effect when non-energized and to rotate the polarization direction of light by 90° when energized by a maximum voltage applying a variable voltage between a zero voltage and the maximum voltage to vary the level of reflectivity of the device.

21. The method of claim 19, comprising:

setting a viewing surface active polarizer to be in a non-absorptive state when not energized, and to absorb an x-direction polarization of incident light and transmit a y-direction polarization when energized by application of voltage, setting the first and second static reflective polarizers to reflect said x-direction polarization of light, setting the active polarization rotator to have no effect when energized by a maximum voltage but to rotate the polarization direction of light by 90° when in a non-energized state applying a variable voltage between a zero voltage and the maximum voltage to vary the level of reflectivity of the device.

22. A device for reflecting light at variable intensity by application of a variable voltage to the device, said device comprising:

a viewing surface having an active absorptive polarizer, adjacent a first static non-switchable reflective polarizer, adjacent an active electrically switchable polarization rotator, adjacent a second static non-switchable reflective polarizer, wherein the active absorbing polarizer and active polarization rotator are electronically switchable, configured such that the device has maximum reflectivity when the device is in an unenergized state and minimum reflectivity when the device is activated by a maximum voltage applied to the active absorptive polarizer or the active polarization rotator or both.

23. The optical device of claim 22, wherein the device reflects more than 50% of incident light when it is in its maximum reflective state and reflects less than 20% of incident light when it is in its minimum reflective state.

24. The optical device of claim 22, wherein the swing between its maximum and minimum reflective states is more than 50%.

25. The optical device of claim 22, wherein the device is used as a window, visor, or helmet.

* * * * *